United States Patent
Choi et al.

(10) Patent No.: US 11,832,203 B2
(45) Date of Patent: *Nov. 28, 2023

(54) METHOD AND APPARATUS FOR DETERMINING UPLINK TRANSMISSION TIMING

(71) Applicant: Samsung Electronics Co., Ltd., Gyeonggi-do (KR)

(72) Inventors: Sangwon Choi, Seoul (KR); Peng Xue, Gyeonggi-do (KR); Hyunkyu Yu, Gyeonggi-do (KR); Hyunseok Ryu, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/460,599

(22) Filed: Aug. 30, 2021

(65) Prior Publication Data

US 2021/0392603 A1 Dec. 16, 2021

Related U.S. Application Data

(63) Continuation of application No. 16/100,863, filed on Aug. 10, 2018, now Pat. No. 11,109,338.

(30) Foreign Application Priority Data

Aug. 10, 2017 (KR) .................. 10-2017-0101932

(51) Int. Cl.
*H04W 56/00* (2009.01)
*H04W 48/12* (2009.01)
(Continued)

(52) U.S. Cl.
CPC ....... *H04W 56/0045* (2013.01); *H04W 48/12* (2013.01); *H04W 72/0453* (2013.01); *H04W 72/21* (2023.01)

(58) Field of Classification Search
CPC ......... H04W 74/0833; H04W 72/0413; H04W 56/0005; H04W 72/0453; H04W 48/12
See application file for complete search history.

(56) References Cited

U.S. PATENT DOCUMENTS 11,109,338 B2   8/2021  Choi et al.
2014/0086213 A1*  3/2014  Kwon ............... H04W 56/0005
                                                      370/331
(Continued)

FOREIGN PATENT DOCUMENTS

EP          2 827 632        1/2015

OTHER PUBLICATIONS

Ericsson, "Requirements for NR UE Timing Advance",R4-1706716, 3GPP TSG-RAN WG4 Meeting NR#2 AdHoc,Jun. 27-29, 2017, 4pages(Year:2017) (Year: 2017).*

(Continued)

*Primary Examiner* — Romani Ohri
(74) *Attorney, Agent, or Firm* — The Farrell Law Firm, P.C.

(57) ABSTRACT

The present disclosure relates to a communication technique that combines a 5G communication system for supporting a data rate that is higher than that of a beyond 4G system with IoT technology, and a system thereof. The present disclosure may be applied to intelligent services on the basis of 5G communication technology and IoT related technology, such as smart home, smart building, smart city, smart car or connected car, health care, digital education, retail, security and safety related services. The present disclosure relates to a method and an apparatus for operations of a terminal and a base station to transmit an uplink signal in a communication system, and more particularly, to a method by a base (Continued)

station for generating timing advance information for uplink transmission of a terminal and a reception method by the terminal.

20 Claims, 11 Drawing Sheets

(51) Int. Cl.
*H04W 72/21* (2023.01)
*H04W 72/0453* (2023.01)

(56) References Cited

U.S. PATENT DOCUMENTS

| | | | |
|---|---|---|---|
| 2015/0003442 | A1 | 1/2015 | Sun et al. |
| 2016/0302129 | A1 | 10/2016 | Lohr et al. |
| 2017/0019163 | A1 | 1/2017 | Yoshimoto et al. |
| 2017/0070994 | A1 | 3/2017 | Rico Alvarino et al. |
| 2017/0223746 | A1 | 8/2017 | Jeong et al. |
| 2019/0013982 | A1* | 1/2019 | Sun .................. H04L 5/0048 |
| 2019/0104554 | A1* | 4/2019 | Amuru ............ H04W 74/0833 |
| 2019/0173721 | A1* | 6/2019 | Gao ................. H04L 27/26025 |
| 2019/0174516 | A1* | 6/2019 | Shimezawa ........... H04W 72/04 |
| 2019/0380071 | A1 | 12/2019 | Liu |
| 2020/0229152 | A1* | 7/2020 | Park .................. H04L 5/0094 |
| 2020/0296765 | A1* | 9/2020 | Kim .................. H04W 56/001 |

OTHER PUBLICATIONS

MediaTek Inc., "Further Details on Wider Bandwidth Operations in NR", R1-17010796, 3GPP TSG RAN WG1 NR Ad-Hoc#2, Jun. 27-30, 2017, 7 pages.

Motorola Mobility, "Discussion on RACH Numerology and Procedure", R1-1612746, 3GPP TSG RAN WG1 Meeting #87, Nov. 14-18, 2016, 3 pages.

MediaTek Inc., "Efficient Wider Bandwidth Operations for NR", R1-1704445, 3GPP TSG RAN WG1 Meeting #88bis, Apr. 13-17, 2017, 10 pages.

Huawei, HiSilicon, "Further Consideration on UE Transmit Timing and Timing Advance in NR", R4-1706733, 3GPP TSG-RAN WG4 Meeting NR#2, Jun. 27-29, 2017, 4 pages.

European Search Report dated Jun. 25, 2020 issued in counterpart application No. 18843076.3-1205, 10 pages.

Ericsson, "Requirements for NR UE Timing Advance", R4-1706716, 3GPP TSG-RAN WG4 Meeting NR#2 Ad Hoc, Jun. 27-29, 2017, 4 pages.

Ericsson, "Further Analysis of UE Initial Transmit Timing Requirement", R4-1706837, 3GPP TSG RAN WG4 Meeting NR #2, Jun. 27-29, 2017, 4 pages.

Qualcomm Incorporated, "Timing Advance for Different Numerology", R1-1711208, 3GPP TSG-RAN WG1 NR AdHoc #2, Jun. 27-30, 2017, 1 page.

International Search Report dated Nov. 23, 2018 issued in counterpart application No. PCT/KR2018/009095, 3 pages.

Chinese Office Action dated Sep. 5, 2022 issued in counterpart application No. 201880051840.7, 25 pages.

Korean Office Action dated Jun. 8, 2023 issued in counterpart application No. 10-2018-0093737, 8 pages.

Vietnamese Office Action dated Aug. 24, 2023 issued in counterpart application No. 1-2020-01264, 3 pages.

* cited by examiner

METHOD AND APPARATUS FOR DETERMINING UPLINK TRANSMISSION TIMING

CROSS-REFERENCE TO RELATED APPLICATION

This application is a Continuation of U.S. Ser. No. 16/100,863, which was filed in the U.S. Patent and Trademark Office on Aug. 10, 2018, and claims priority under 35 U.S.C. § 119(a) to Korean Patent Application No. 10-2017-0101932, which was filed in the Korean Intellectual Property Office on Aug. 10, 2017, the entire disclosure of each of which is incorporated herein by reference.

BACKGROUND

1. Field

The present disclosure relates generally to a communication system, and more particularly, to a method and an apparatus for determining uplink transmission timing for uplink transmission of a terminal in a communication system.

2. Description of the Related Art

In order to meet an increasing demand for wireless data traffic, after commercialization of 4G communication systems, efforts have been made to develop an improved 5G or pre-5G communication system. The 5G or pre-5G communication system may also be referred to as a beyond 4G network communication system or a post long-term evolution (LTE) system.

In order to achieve high data rate, implementation of a 5G communication system in an ultrahigh frequency (mmWave) band (e.g., a 60 GHz band) has been considered. In order to mitigate path loss of radio waves and to increase transfer distances of the radio waves in the ultrahigh frequency band, technologies such as beamforming, massive multiple-input and multiple-output (MIMO), full dimension MIMO (FD-MIMO), array antennas, analog beamforming, and large scale antennas have been discussed for the 5G communication system.

For system network improvement in the 5G communication system, technology developments have been made for an evolved small cell, advanced small cell, cloud radio access network (RAN), ultra-dense network, device to device communication (D2D), wireless backhaul, moving network, cooperative communication, coordinated multi-points (CoMP), and reception interference cancellation.

In addition, in the 5G system, advanced coding modulation (ACM) systems such as hybrid frequency-shift keying (FSK) and quadrature amplitude modulation (QAM) modulation (FQAM) and sliding window superposition coding (SWSC), and advanced connection technologies such as filter bank multicarrier (FBMC), non-orthogonal multiple access (NOMA), and sparse code multiple access (SCMA), have been developed.

The Internet is now evolving to the Internet of things (IoT), where distributed entities, i.e., things, exchange and process information. The Internet of everything (IoE), which is a combination of the IoT technology and big data processing technology through connection with a cloud server, has also emerged.

As technology elements, such as sensing technology, wired/wireless communication and network infrastructure, service interface technology, and security technology, have been demanded for IoT implementation, a sensor network for machine-to-machine (M2M) connection, M2M communication, machine type communication (MTC), etc., have recently been researched.

An IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beam-forming, MIMO, and array antennas, which correspond to the 5G communication technology. As the big data processing technology described above, application of a cloud RAN would be an example of convergence between the 5G technology and the IoT technology.

However, in a 5G communication system, various numerologies (e.g., subcarrier spacings) may be used to support various services. In an environment where such various numerologies are used, a symbol length and a cyclic prefix (CP) length may be changed in accordance with the subcarrier spacing, and thus, generation and operation of timing advance (TA) information should change in accordance with the numerologies.

Further, in a 5G communication system using beamforming, the generation and operation of TA information should change in accordance with the kind and direction of beams used in a base station and a terminal. For example, the generation and operation of the TA information for the beam having a wide beam width may be different from those of the TA information for the beam having a narrow beam width.

Further, if beam directions are different from each other, while the same beam width is used, the generation and operation of the TA information may differ.

SUMMARY

The present disclosure is provided to solve the above-described problem, and to provide at least the advantages described below.

Accordingly, an aspect of the present disclosure is to provide a method and an apparatus for generating TA information in a system using different numerologies, which is one of features of a 5G communication system.

Another aspect of the present disclosure is to provide a method and an apparatus for generating TA information in a 5G communication system using beamforming.

According to the aspects of the present disclosure, the TA information can be efficiently generated and operated in the system using different numerologies.

Further, according to the aspects of the present disclosure, the TA information can be efficiently generated and operated in the system using beamforming.

In accordance with an aspect of the present disclosure, a method is provided for a terminal in a wireless communication system. The method includes, receiving, from a base station, a message including configuration information associated with a bandwidth part (BWP) for transmitting an uplink signal; receiving, from the base station, first information on a timing advance (TA) command for adjusting a current timing of an uplink transmission; determining a timing of the uplink transmission based on second information and the first information; and transmitting, to the base station, the uplink signal on the BWP using the determined timing of the uplink transmission. The configuration information includes information on a subcarrier spacing for the BWP, and the second information is determined based on an index value corresponding to the subcarrier spacing for the BWP, the index value being determined based on the information on the subcarrier spacing for the BWP.

In accordance with another aspect of the present disclosure, a method is provided for a base station in a wireless communication system. The method includes transmitting, to a terminal, a message including configuration information associated with a bandwidth part (BWP) for transmitting an uplink signal; transmitting, to the terminal, first information on a timing advance (TA) command for adjusting a current timing of an uplink transmission; and receiving, from the terminal, an uplink signal on the BWP according to a timing of the uplink transmission. The timing of the uplink transmission is determined based on second information and the first information. The configuration information includes information on a subcarrier spacing for the BWP. The second information is determined based on an index value corresponding to the subcarrier spacing for the BWP, the index value being determined based on the information on the subcarrier spacing for the BWP.

In accordance with another aspect of the present disclosure, a terminal in a wireless communication system is provided. The terminal includes a transceiver; and a controller configured to control the transceiver to receive, from a base station, a message including configuration information associated with a bandwidth part (BWP) for transmitting an uplink signal, control the transceiver to receive, from a base station, first information on a timing advance (TA) command for adjusting a current timing of an uplink transmission, determine a timing of the uplink transmission based on second information and the first information, and control the transceiver to transmit, to the base station, the uplink signal on the BWP using the determined timing of the uplink transmission. The configuration information includes information on a subcarrier spacing for the BWP, and the second information is determined based on an index value corresponding to the subcarrier spacing for the BWP, the index value being determined based on the information on the subcarrier spacing for the BWP.

In accordance with another aspect of the present disclosure, a base station in a wireless communication system is provided. The base station includes a transceiver; and a controller configured to control the transceiver to transmit, to a terminal, a message including configuration information associated with a bandwidth part (BWP) for transmitting an uplink signal, the configuration information including information on a subcarrier spacing for the BWP, control the transceiver to transmit, to the terminal, first information on a timing advance (TA) command for adjusting a current timing of an uplink transmission, and control the transceiver to receive, from the terminal, an uplink signal on the BWP according to a timing of the uplink transmission. The timing of the uplink transmission is determined based on second information and the first information. The configuration information includes information on a subcarrier spacing for the BWP, and The second information is determined based on an index value corresponding to the subcarrier spacing for the BWP, the index value being determined based on the information on the subcarrier spacing for the BWP.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
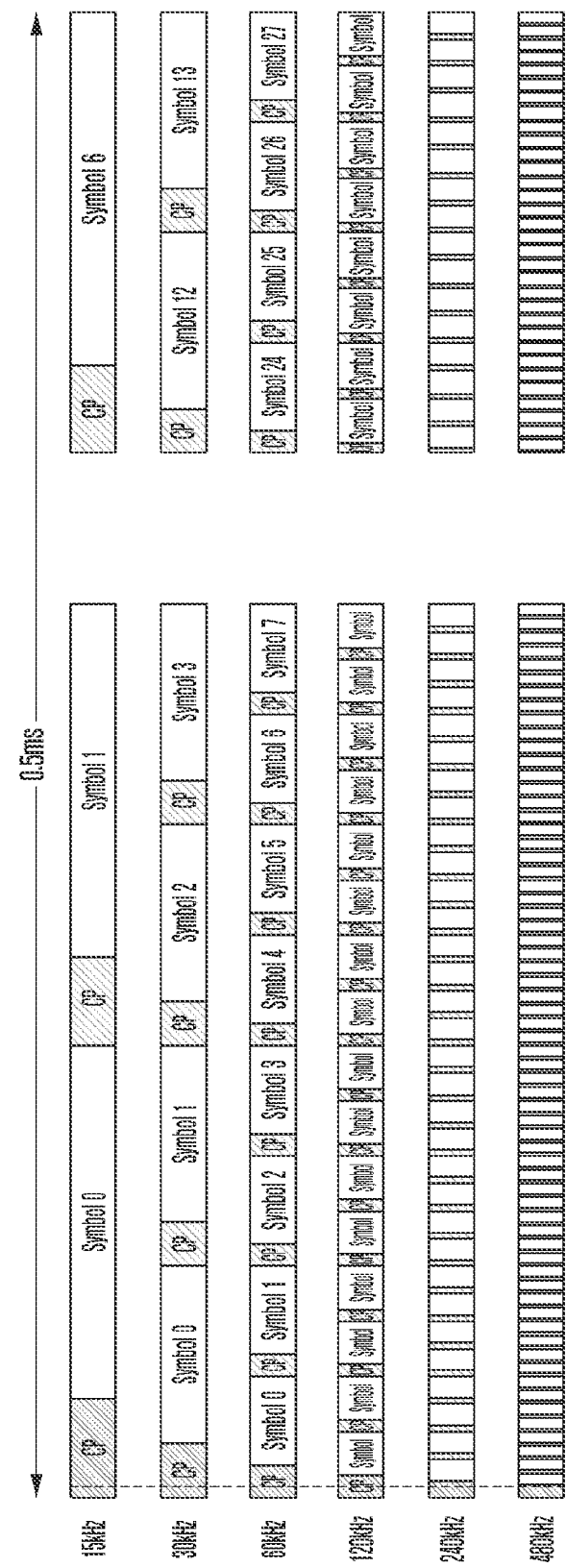
FIG. 1 illustrates CPs and symbols in over a 0.5 ms interval for each subcarrier spacing according to an embodiment.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

For the same reason, in the accompanying drawings, some constituent elements are exaggerated, omitted, or roughly illustrated. Further, sizes of some constituent elements may not accurately reflect the actual sizes thereof.

In the drawings, the same drawing reference numerals may be used for the same elements across various figures.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, are for implementing the functions specified in the flowchart block or blocks.

The computer program instructions may also be stored in a computer-usable or computer-readable memory that can direct a computer or another programmable data processing apparatus to function in a particular manner, such that the instructions stored in the computer-usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process, such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). In some alternative implementations, the functions noted in the blocks may occur in different orders. For example, two blocks shown in succession may in fact be executed substantially at the same time or the blocks may sometimes be executed in the reverse order, depending upon the functionality involved.

Herein, the term "unit" may mean, but is not limited to, a software or hardware component, such as a field-programmable gate array (FPGA) or an application-specific integrated circuit (ASIC), which performs certain tasks. However, a "unit" is not limited to software or hardware. A "unit" may advantageously be configured to reside on an addressable storage medium and configured to be executed on one or more processors.

Thus, a "unit" may include, e.g., components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and "units" may be combined into fewer components and "units" or further separated into additional components and "units". Further, the components and "units" may be implemented to operate one or more central processing units (CPUs) in a device or a security multimedia card. A "unit" may include one or more processors.

In a communication system, a timing advance (TA) has been applied to an uplink transmission of a terminal to allow uplink signals transmitted by terminals existing at different locations to be received in a base station at the same time.

If a terminal transmits the uplink without applying the TA (i.e., if a terminal transmits the uplink based on a time when a downlink signal is received), a mismatch occurs between the time when the base station receives the uplink signal and the time when the base station transmits the downlink, and thus, inter-symbol interference (ISI) or inter-carrier interference (ICI) may occur, deteriorating the performance of the signal received in the base station.

Further, if terminals at different locations in a cell transmit uplink signals based on their downlink timings, without applying the TA, ISI and ICI may occur between the uplink signals transmitted from the different terminals, which may deteriorate the reception performances of the uplink signals received in the base station. Accordingly, the TA is intended to solve the above-described problems.

A base station may measure a round trip delay (RTD) between itself and a terminal through a random access preamble transmitted by the terminal, and may adjust the transmission time of the uplink transmission signal for each terminal based on the measured RTD value. For example, a terminal located close to a base station (hereinafter, terminal-A) may have a relatively shorter RTD than the RTD of a terminal located far apart from the base station (hereinafter, terminal-B). Accordingly, the base station may notify terminal-B of the transmission time that is relatively earlier than the transmission time of which the base station notifies terminal-A.

In LTE, a maximum 20 MHz bandwidth is supported, and the subcarrier spacing is 15 kHz. In this case, the symbol length becomes about 66.67 μs. Further, in LTE, a CP is used to solve the problems of ISI and ICI occurring due to propagation delay. In accordance with the length of the CP, normal CP (NCP) and extended CP (ECP) may be supported. For a short CP, the length of the CP is about 4.7 μs, whereas for a long CP, the length of the CP is about 5.2 μs. The long CP is used for first and eighth symbols among 14 symbols constituting one subframe, and the short CP is used for the remaining 12 symbols.

In LTE, an initial TA is allocated as 11-bit information through a random access response (RAR), and an update of the TA value is allocated as 6-bit information through a medium access control (MAC)-control element (CE). A terminal analyzes the bit information of the TA value through a defined granularity value. The 11 bit initial TA information received through the RAR may be transferred as one value of $T_A=0, 1, 2, \ldots, 1282$, and the terminal calculates a sample value to be applied to determination of the actual transmission time by multiplying the TA value transferred from the base station by the TA granularity.

For example, if 11 bits of the TA command of the RAR are [00000000011], $T_A=3$, and thus, the TA value to be applied is three times the granularity. That is, the TA value becomes $N_{TA}=3 \times 16_s^{LTE}$, and thus, becomes 48 times the LTE sample duration (here, the TA value to be actually applied is $N_{TA}$, the TA granularity in LTE is $16_s^{LTE}$, and the TA command received from the base station is $T_A$).

Information of the MAC-CE is composed of 6 bits, and may be transferred to one of $T_A=0, 1, 2, \ldots, 63$. The terminal uses Equation (1) for TA command update.

$$N_{TA}^{New}=N_{TA}^{Old}+16T_s^{LTE}(T_A-31) \quad (1)$$

In Equation (1), information provided from the MAC-CE is also used to determine the actual transmission time by multiplying the information by the granularity. In Equation (1), $N_{TA}^{Old}$ is the existing TA value, $N_{TA}^{New}$ is a TA value to be newly updated, and $T_A$ is TA command update information allocated through the MAC-CE.

As described above, after commercialization of the 4G communication system, efforts have been made to develop an improved 5G communication system.

A feature of a 5G communication system is to support various service scenarios having different requirements in comparison to the 4G communication system. Here, the requirements may include latency, data rate, battery life, the number of simultaneously accessing users, and communicable coverage.

For example, an enhanced mobile broad band (eMBB) service is intended to provide a high data rate over 100 times as compared with the 4G communication system, and may be considered as a service for supporting user's data traffic that is abruptly increasing.

As another example, an ultra-reliable low-latency communication (URLLC) service attempts very high data/control information transmission/reception reliability and very low latency as compared with the 4G communication system, and may be useful for automated vehicle driving, e-health, and services using drones.

As still another example, a massive machine-type-communication (mMTC) service is intended to support communication between a larger number of devices per single area as compared with the 4G communication system, and is an evolved service of 4G MTC, such as smart metering.

In order to support such different services, in the 5G communication system, use of different numerologies for services or requirements may be considered. A numerology may include at least one of subcarrier spacing, orthogonal frequency division multiplexing (OFDM) symbol length (or single carrier-frequency division multiplexing (SC-FDM) symbol length), transmission bandwidth, fast Fourier transform (FFT) size, and CP length.

For example, in a URLLC service, in order to satisfy short latency requirements, subcarrier spacing (e.g., 30 kHz or 60 kHz) that is larger than that of the 4G communication system in the related art (using 15 kHz subcarrier spacing) may be used. Because the subcarrier spacing is increased twice from 15 kHz to 30 kHz, the OFDM (or SC-FDM) symbol length may be halved. Accordingly, by using the short symbol length, latency can be reduced.

The present disclosure proposes an uplink TA generation and operation method in a new radio (NR) system supporting such various numerologies. More specifically, the present disclosure proposes a TA granularity configuration method in various numerologies, an operation and signaling method in an environment in which different numerologies are used for BWPs as a method in which a terminal simultaneously uses several numerologies, and an operation and signaling method required to perform different TAs for respective beams when transmission and reception signals have different arrival times for beams.

In a 5G communication system (or NR system), subcarrier spacing of 15 kHz, 30 kHz, 60 kHz, 120 kHz, 240 kHz, and 480 kHz may be used. If the subcarrier spacing becomes larger, the symbol duration and CP duration become shorter.

In order to support a higher data rate than the 4G system, the NR system supports broadband, which is an increase of the fast Fourier transform (FFT) size. For example, the 4G system can use the FFT having a size of 2048, whereas the NR system can use the FFT having a maximum size of 4096. The sampling duration in the NR system may be determined as $$T_s^{NR} = \frac{1}{64}T_s^{LTE} = \frac{1}{480000 \times 4096} \text{ seconds,}$$

which may be 64 times shorter than the sampling duration in the LTE.

FIG. 1 illustrates CPs and symbols in over a 0.5 ms interval for each subcarrier spacing according to an embodiment.

Referring to FIG. 1, in the NR system using various numerologies, the symbol length and the CP length may differ depending on the subcarrier spacing supported in the system. More specifically, in the NR system, the subcarrier spacing may be increased by exponential of 2 ($2^n$) (e.g., 15 kHz, 30 kHz, 60 kHz, etc.). Accordingly, the symbol length and the CP length may be halved. That is, using 480 kHz subcarrier spacing, the CP length may be shortened by $2^5=32$ as compared with 15 kHz. Accordingly, the granularity of the TA at 480 kHz should be decreased as compared with 15 kHz. In the NR system, the granularity of the TA should be configured differently for each numerology.

In LTE, an initial TA command value of 11 bits is received in an RAR process, and the actual TA is calculated by applying the received value and the granularity determined in the standard. Similarly, even in the NR system, an initial TA command of N1 bits may be transmitted. The terminal should perform the TA using the received TA value, and the granularity to be used for calculation may be determined through, e.g., one of the various options as follows.

Option 1: Method following a rule pre-engaged between a terminal and a base station (pre-defined value is used)
 1-1: Scaled TA granularity
 1-2: Configuration based on the numerology used to transmit Msg.1
 1-3: Configuration based on the numerology used for a DL SS block
 1-4: Configuration based on the TA granularity mapped to the center frequency
Option 2: Method by a base station for configuration of the TA granularity
Option 3: Method for configuring one specific granularity value in the same manner as the LTE In option 1, the TA granularity corresponds to a predefined method for each numerology. More specifically, various rules predefined for each numerology may exist.

Option 1-1 corresponds to a method for the TA granularity scaled for each NR numerology based on the LTE granularity. As shown in Table 1 below, if the TA granularity value is predetermined as $(1024 \cdot 2^{-\mu})T_s^{NR}$ with respect to numerology index u, it becomes equal to the TA granularity of the LTE in 15 kHz subcarrier spacing, and as the subcarrier spacing is increased, the TA granularity is proportionally decreased.

TABLE 1

| Numerology Index | Numerology (kHz) | TA Granularity | CP Duration |
|---|---|---|---|
| μ | $\Delta f = 2^\mu \cdot 15$ | $(1024 \cdot 2^{-\mu})T_s$ | $T_{CP} = (9126 \cdot 2^{-\mu})T_s$ |
| 0 | 15 | $1024T_s$(0.52 us) | $9216T_s$(4.7 us) |
| 1 | 30 | $512T_s$(0.26 us) | $4608T_s$(2.34 us) |
| 2 | 60 | $256T_s$(0.13 us) | $2304T_s$(1.17 us) |
| 3 | 120 | $128T_s$(0.065 us) | $1152T_s$(0.59 us) |
| 4 | 240 | $64T_s$(0.032 us) | $576T_s$(0.29 us) |
| 5 | 480 | $32T_s$(0.016 us) | $288T_s$(0.15 us) |

Option 1-2 corresponds to a method for engagement of the TA granularity based on the numerology of Msg.1 in a random access channel (RACH) procedure as a rule. In this case, the numerology used to transmit Msg.1 may be transmitted through a physical broadcast channel (PBCH) or remaining minimum system information (RMSI)/Other system information (OSI).

For example, if the subcarrier spacing of Msg.1 is 1.5 kHz or 5 kHz based on Table 1, granularity ($1024 \, T_s^{NR}$) of numerology index 0 may be used, and if the subcarrier spacing of Msg.1 is 15 kHz or 30 kHz, granularity ($256 \, T_s^{NR}$) of numerology index 2 may be used. Further, if the subcarrier spacing of Msg.1 is 60 kHz or 120 kHz, granularity ($64 \, T_s^{NR}$) of numerology index 4 may be used.

Option 1-3 corresponds to a method for engagement of the TA granularity using the subcarrier spacing of a DL synchronization signal (SS) block. For example, if the subcarrier spacing of the SS block is 15 kHz based on Table 1, granularity (1024 $T_s^{NR}$) of numerology index 0 may be used, and if the subcarrier spacing of the SS block is 30 kHz, granularity (512 $T_s^{NR}$) of numerology index 1 may be used. Further, if the subcarrier spacing of the SS block is 120 kHz, granularity (128 $T_s^{NR}$) of numerology index 3 may be used, and if the subcarrier spacing of the SS block is 240 kHz, granularity (64 $T_s^{NR}$) of numerology index 4 may be used.

Option 1-4 corresponds to a method for pre-engagement of the TA granularity for each frequency band (or center frequency according to the frequency band). For example, in the frequency band having the center frequency that is equal to or lower than 6 GHz based on Table 1, TA granularity value (1024 $T_s^{NR}$) corresponding to numerology index 0 may be used, and in the frequency band having the center frequency of 6 to 15 GHz, TA granularity value (256 $T_s^{NR}$) of numerology index 2 may be used. Further, in the frequency band having the center frequency that is equal to or higher than 15 GHz, TA granularity value (64 $T_s^{NR}$) of numerology index 4 may be used.

Unlike option 1, option 2 corresponds to a method in which a base station notifies a terminal of TA granularity through signaling. Such notification may be performed once during an initial access, and this method may include even a method for changing the TA granularity value in the middle. As possible signaling, a method for including the TA granularity in a PBCH or RMSI and a method for including the TA granularity in a RAR message in a RACH procedure can be provided.

Option 3 corresponds to a method for using the same granularity value without changing the TA granularity value in accordance with the numerology. In this case, if too large a granularity value is configured, the TA value becomes larger than the CP length in the numerology having large subcarrier spacing, and thus, it is not possible to align the timing of an uplink reception signal of the base station (e.g., if the TA granularity is determined as 1024 $T_s^{NR}$, it becomes larger than the CP length of 288 $T_s^{NR}$ in the subcarrier spacing 480 kHz. In LTE, the TA granularity has been fixed to about 1/10 of the CP).

Because of this, one TA granularity value should be determined based on the smallest value thereof. However, too small a TA granularity may cause the number of bits to be increased in transferring the TA values on the whole, which may cause increased overhead (in expressing the same absolute time, small granularity requires a large number of bits).

In LTE, the TA command update is received as a value of 6 bits through the MAC-CE, the existing TA command value is updated by the value, and the actual TA is calculated by applying the granularity determined in the standard. Similarly, even in the NR system, the TA command update value of N2 bits may be transmitted. Through determination of the granularity for the N2-bit information, the existing TA command value can be updated. The granularity value of N2 bits is basically equal to the initial TA command value. However, different numerology may exist between BWPs. In this process, the terminal may be required to change the TA granularity during communications with the base station.

In order to solve the above-described problem, the operations of the terminal and the base station and signaling in an environment where different numerologies are used for BWPs will be hereinafter described.

In the NR system, the terminal can operate in BWPs having different numerologies. Consequently, the terminal requires an additional operation capable of operating the TA of different granularities for BWPs because the TA granularity becomes a unit for calculating the TA command time, and if the TA granularity is changed, an absolute time in which the timing advance is applied with the same TA command value is also changed. Accordingly, if the TA granularity is changed for each BWP, it is required to re-calculate the TA command for each granularity in the unit of the changed granularity.

From the viewpoint of the terminal, a plurality of numerologies for BWPs may exist, and there may be M different TA granularities. If a certain TA command update signal occurs in such a situation, this may cause a problem in identifying which granularity of the TA command message the terminal should consider for calculation.

Methods to solve such a problem will be described in detail through the drawings as follows.

Option 1: The TA granularity value having the greatest resolution among M different granularities is used.

Option 2: The TA granularity value is configured by gNB to match the BWP used for transmission (granularity information is transferred during the TA command update).

Figure 2A:
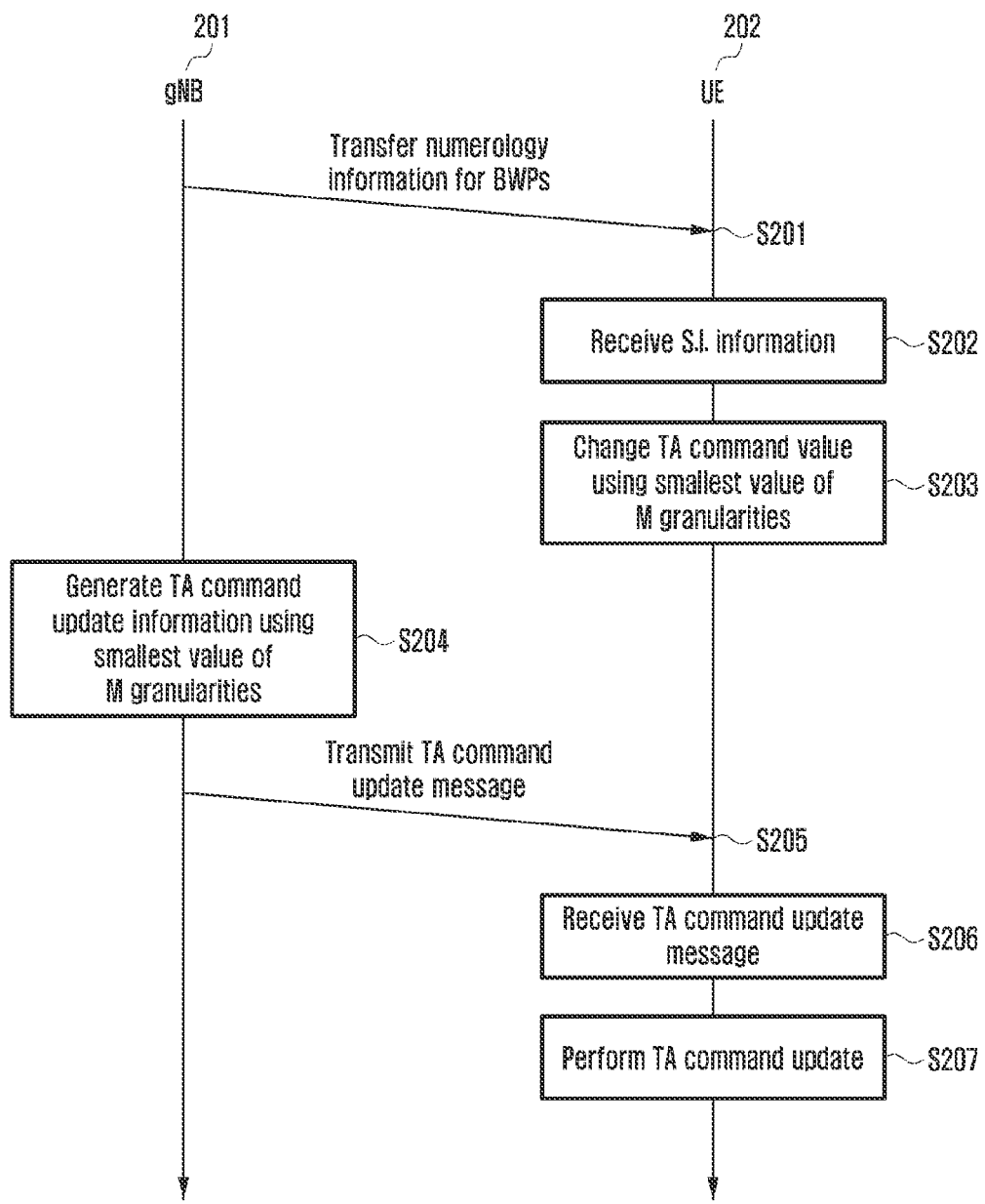
FIG. 2A illustrates operations of a base station and a terminal in an environment in which different numerologies are used for bandwidth parts (BWPs) according to an embodiment.
Figure 2B:
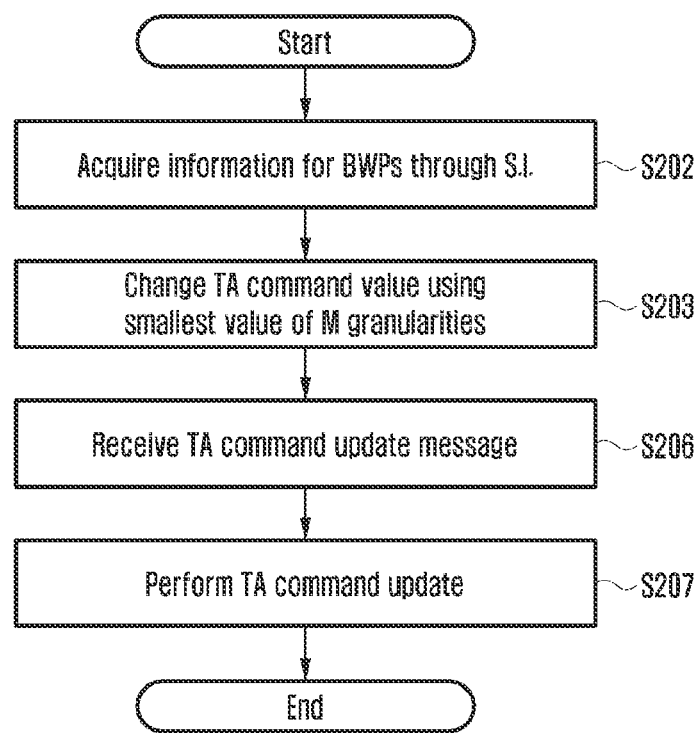
FIG. 2B is a flowchart illustrating an operation of a terminal in an environment in which different numerologies are used for BWPs according to an embodiment.

FIG. 2A illustrates operations of a base station and a terminal in an environment in which different numerologies are used for BWPs according to an embodiment. FIG. 2B is a flowchart illustrating an operation of a terminal in an environment in which different numerologies are used for BWPs according to an embodiment.

More specifically, FIG. 2A illustrates operations of a base station and a terminal for option 1 as described above, and FIG. 2B illustrates an operation of the terminal for the option 1. In FIGS. 2A and 2B, corresponding operations are denoted using the same reference numerals.

Referring to FIGS. 2A and 2B, in step S201, a base station 201 transfers, to a terminal (or UE) 202, numerology information for each BWP in the form of system information through radio resource control (RRC).

In step S202, the terminal 202 discovers the numerology for each BWP from the transferred system information.

If M granularities exist in N BWPs, the terminal 202 changes the granularity to the granularity having the greatest resolution among M granularities. For example, if the subcarrier spacing of a band used by a specific terminal for an uplink (UL) is 30 kHz, one BWP is additionally allocated, and the subcarrier spacing of the BWP is 120 kHz, the granularity is changed from granularity 512 $T_s^{NR}$ of 30 kHz to granularity 128 $T_s^{NR}$ of 128 kHz.

In step S203, the existing TA command value is changed to a smaller granularity value, and the TA command value is updated based on 128 $T_s^{NR}$.

More specifically, the gNB 201 generates TA command update information using the smallest granularity value among M granularity values in step S204, and includes the TA command update information in a TA command update message to be transmitted to the terminal 202 in step S205.

The terminal 202 receives the TA command update message in step S206 and updates the TA command based on the received TA command update message in step S207.

Figure 2C:
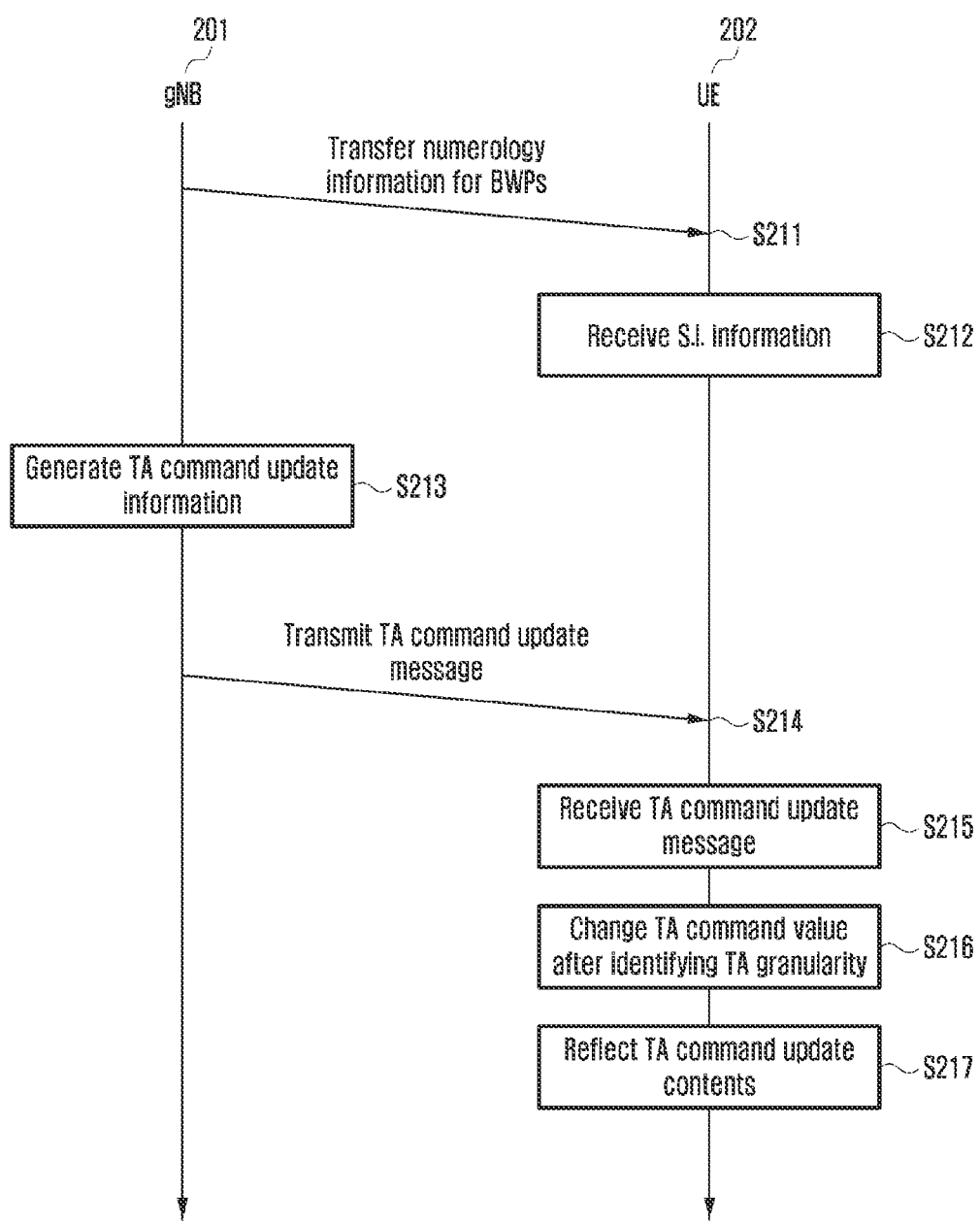
FIG. 2C illustrates operations of a base station and a terminal in an environment in which different numerologies are used for BWPs according to an embodiment.
Figure 2D:
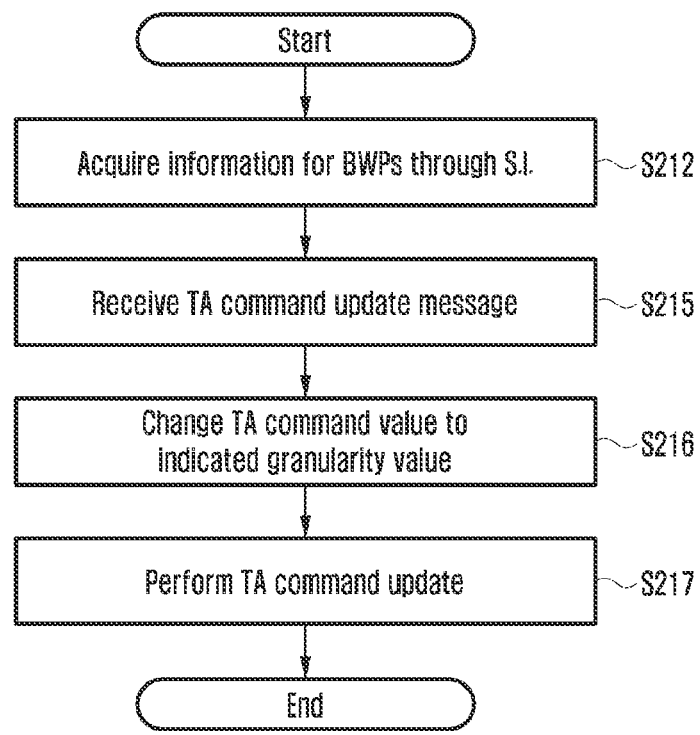
FIG. 2D is a flowchart illustrating an operation of a terminal in an environment in which different numerologies are used for BWPs according to an embodiment.

FIG. 2C illustrates operations of a base station and a terminal in an environment in which different numerologies are used for BWPs according to an embodiment. FIG. 2D is a flowchart illustrating an operation of a terminal in an environment in which different numerologies are used for BWPs according to an embodiment. More specifically, FIG. 2C illustrates operations of a base station and a terminal for option 2, and FIG. 2D illustrates an operation of the terminal for the option 2. In FIGS. 2C and 2D, corresponding operations are denoted using the same reference numerals.

Referring to FIGS. 2C and 2D, in the same manner as option 1, the terminal 202 receives information for each BWP used for a UL in steps S211 and S212.

Thereafter, the gNB 201 generates TA command update information in step S213, and transmits the generated TA command update information to the terminal 202 through a TA command update message in step S214.

In step S2015, the terminal 202 receives a TA granularity value together with the TA command update message through a MAC-CE.

The terminal 202 corrects the existing TA command value to new granularity using the received TA granularity value together with the TA command update message, and applies an update value thereto in steps S216 and S217.

One difference between option 1 and option 2 is related to a method for notifying of information on a new granularity. For example, option 1 corresponds to a method for implicitly or explicitly notifying of the granularity while transferring the numerology for each BWP, and option 2 corresponds to a method for notifying of the granularity during each TA command update.

The TA command information is composed of limited bits, and if this value is changed to a smaller granularity value, overflow may occur at the TA value that is greater than or equal to specific bits. When such overflow occurs, it is possible for the terminal to set the TA to the maximum value to be transmitted. Further, the remaining part occurring when the granularity value is changed to a larger value can be calculated using a floor operation.

In order to increase the coverage, particularly, in an ultra-high frequency band, digital and analog beamforming technology may be used. In order to compensate for path loss attenuation during signal transmission and reception, a transmission unit and a reception unit may use specific beams, and in this case, as the transmission and reception beams are changed, reception time points of signals received on an uplink may change greatly. Such beam change corresponds to both the base station beam and the terminal beam.

If a beam A that is being used by the terminal is changed to a beam B, an uplink timing related problem may occur in which the reception times of an uplink signal of the base station deviate from each other. If the beam is changed from beam A to beam B and the UL signal is transmitted using beam B while the terminal transmits the UL signal using beam A and applies a TA command value that suits the beam, from the viewpoint of the base station, the reception time of the UL signal of the terminal may differ, and in this case, the signal may not be successfully received, or significant performance deterioration may occur. Accordingly, if the UL transmission beam of the terminal is changed or the UL reception beam of the base station is changed, the TA value should be applied differently to match the changed beam and to perform signaling to support this.

The term "beam group", as used herein, may indicate one beam or plural beams tied into groups. Accordingly, performing a TA operation for beam groups may refer to performing of TA operations with respect to one beam, or performing of TA operations with respect to a group into which multiple beams are tied.

In order to perform the TA operations for beam groups, a TA group (TAG) may be defined so that the plural TA operations can be individually performed. There may be N beam groups and M TAGs, and plural beam groups may be mapped to one TAG. For example, if the base station has two transmission reception points (TRPs) in one cell, the base station may operate two beam groups through setting of beam groups with respect to the TRPs, and may perform the TA operation with respect to the TRPs through setting of two TAGs to match the two beam groups.

The beam group may not be defined in the standard, and may differ in accordance with the operation of the base station. However, in order for the terminal to perform the TA operation for beam groups, the base station should map the beam groups to TAG indexes and notify the terminal of this mapping.

When beam correspondence is applied, i.e., if beam reciprocity is established between transmission and reception beams in both the base station and the terminal, the base station may divide CSI-RS resources into specific groups and may map different TAG indexes to the groups.

A specific group of CSI-RS resources may be referred to using several delimiters, such as resource, set, setting, and process, and when notifying the terminal of configuration information on the CSI-RS through an RRC message, the base station may notify of different TAG index information for the corresponding specific CSI-RS groups. When the base station indicates the UL transmission beam index of the terminal, the terminal may determine what CSI-RS group the corresponding beam belongs to, and then may transmit the UL signal by adjusting the timing of the UL transmission signal being transmitted to the corresponding beam based on the TA command of the corresponding TAG index. Here, the UL transmission beam indication is performed based on the CSI-RS resource, such that the base station will receive the UL signal with the same reception beam as the transmission beam used for the specific CSI-RS resource.

When the beam correspondence is applied, the base station may notify of the TAG index information when performing the UL beam indication. The UL beam indication may be performed based on the CSI-RS resource index in the same manner as described above, and may be performed through various signaling methods, such as physical downlink control channel (PDCCH) downlink control information (DCI), a MAC-CE, and an RRC message.

When the beam correspondence is not applied, i.e., if the beam reciprocity is not established between transmission and reception beams in either of the base station and the terminal, the base station may divide sounding reference signal (SRS) resources into specific groups and may map different TAG indexes to the groups.

A group of SRS resources may be referred to using several delimiters, such as resource, set, setting, and process, and in case of notifying the terminal of configuration information on the SRS through an RRC message, the base station may notify of different TAG index information for the corresponding specific SRS groups.

When the base station indicates the UL transmission beam index of the terminal, the terminal may determine what SRS group the corresponding beam belongs to, and then may transmit the UL signal by adjusting the timing of the UL transmission signal being transmitted to the corresponding beam based on the TA command of the corresponding TAG index. Here, the UL transmission beam indication is performed based on the SRS resource, such that the terminal will transmit the UL signal as the transmission beam with respect to the specific SRS resource.

When the beam correspondence is not applied, the base station may notify the TAG index information when performing the UL beam indication. The UL beam indication may be performed based on the SRS resource index in the same manner as described above, and may be performed through various signaling methods, such as PDCCH DCI, a MAC-CE, and an RRC message.

Although the above-described embodiments have been described to match whether the beam correspondence is applied, they may be applied regardless of whether the beam correspondence is applied.

Hereinafter, operations of the terminal and the base station for applying different TA values for beam groups will be described. First, through an initial random access process, the base station commands one TA value to the terminal, and the terminal sets the UL transmission signal timing based on the corresponding TA value. Thereafter, through negotiation of terminal capability, the base station determines whether to operate a plurality of TAGs. If the minimum capability of the terminal can support the TAGS, the corresponding process may be omitted.

Figure 3:
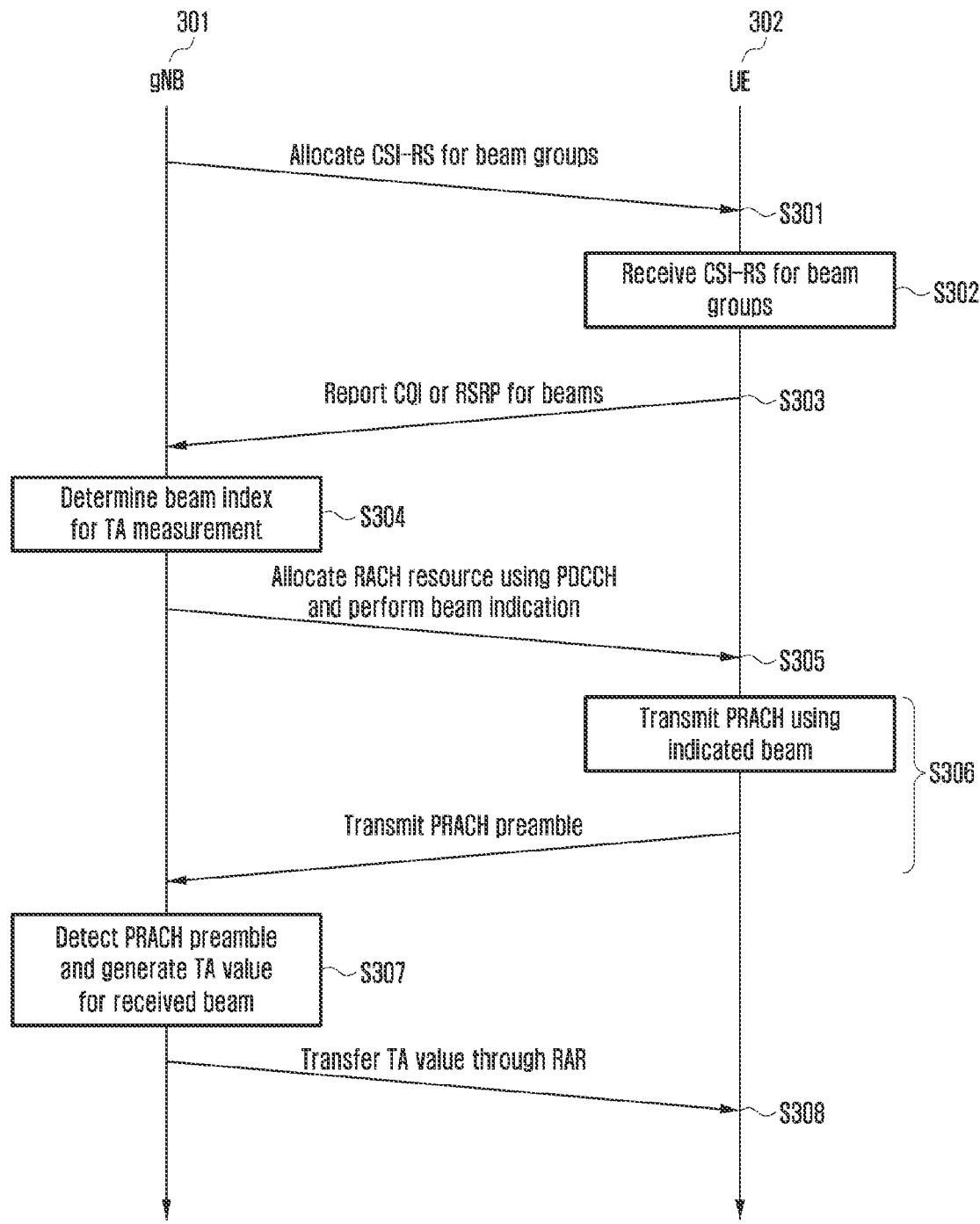
FIG. 3 illustrates operations of a base station and a terminal and signaling to apply different TA values for beams according to an embodiment.

If the base station is to command different TA values for beam groups using two or more TAGs, the base station may command an additional TA value to the terminal through the same process as that illustrated in FIG. 3. Basically, the terminal may transmit the UL signal with respect to one TA, and after an RRC CONNECTED state, the terminal may transmit the UL signal with respect to two or more TA values in accordance with the indication of the base station.

FIG. 3 illustrates operations of a base station and a terminal, and signaling to apply different TA values for beams, according to an embodiment. Specifically, FIG. 3 illustrates an operation for receiving, from the base station, an additional TA value, i.e., a TA value for another TAG index.

Referring to FIG. 3, in step S301, a base station 301 allocates a CSI-RS to a terminal 302 to discriminate beam groups.

The terminal 302 receives and measures the CSI-RS in step S302, and then reports, to the base station, beam information for L candidates with respect to the beam groups in step S303. Here, the beam information includes beam indexes discriminated as CSI-RS resources, channel quality indicator (CQI), or reference signal received power (RSRP) for the beam indexes.

Thereafter, the base station 301 selects the existing DL and UL beams based on the reporting result of the terminal 302. For example, the base station 301 determines the beam indexes for TA measurement in step S304.

In step S305, in order to indicate the TA command with respect to the added TAG index, i.e., another beam group, the base station 301 commands RACH transmission to the terminal using the PDCCH. The corresponding command includes information on the RACH resource and the contents of the UL beam index to be used when the corresponding RACH is transmitted. The UL beam index may be indicated as the CSI-RS resource as described above.

The terminal 302 transmits a physical random access channel (PRACH) preamble to the allocated RACH resource based on the beam information indicated by the base station 301 in step S306, and the base station 301 calculates the TA value for the corresponding beam using the received PRACH in step S307.

In step S308, the base station 301 notifies the terminal 302 of the TA information for the corresponding TAG index through a response message to the preamble transmission, such as an RAR.

Thereafter, maintenance of the UL timing is continuously performed through a message of the MAC-CE for TAGs.

As described above, because the TA values are different from each other in accordance with the beam groups, and the TA values of certain beams are respectively decreased and increased in accordance with the movement of the terminal, the TA command update messages may also be different from each other. In such a situation, two of the following options become possible to operate different TA values for beam groups in more detail.

Option 1: TA commands are separately operated for beam groups.

Option 2: Only an offset value is indicated in the form of TA command update in case of the beam change when TA commands are equally operated for beam groups.

Option 1 corresponds to a method in which TA commands for beam groups are independently operated and updates also independently received. The TA value through a new beam is stored and managed separately from the TA value acquired in the initial RACH process.

Figure 4A:
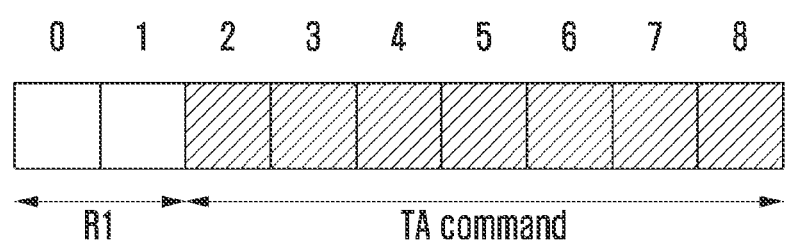
FIG. 4A illustrates a TA command update message according to an embodiment.

FIG. 4A illustrates a TA command update message according to an embodiment. Specifically, FIG. 4A illustrates a 9 bit TA command update message, which a base station sends to a terminal through a MAC-CE in LTE. Among the 9 bits of the TA command update message, 2 bits (0 and 1) indicated by R1 are reserved bits or bits used for a cell tag in accordance with the situation, and the remaining 6 bits (2-8) correspond to a message for updating the TA command.

Figure 4B:
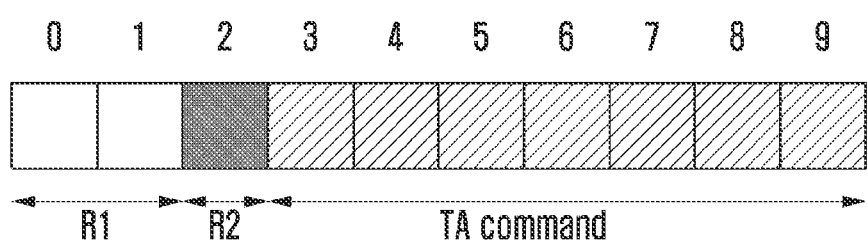
FIG. 4B illustrates a TA command update message according to an embodiment.

FIG. 4B illustrates a TA command update message according to an embodiment. Specifically, FIG. 4B illustrates a TA command update message for discriminating different TA command updates for beam groups. TA updates for beams are possible using an additional beam tag. In FIG. 4B, R1 indicates 2 bits used for the existing reserve or cell TAG, and R2 indicates a bit that is set to 0 or 1 as the beam is changed and can perform TA command updates for beam groups.

Figure 4C:
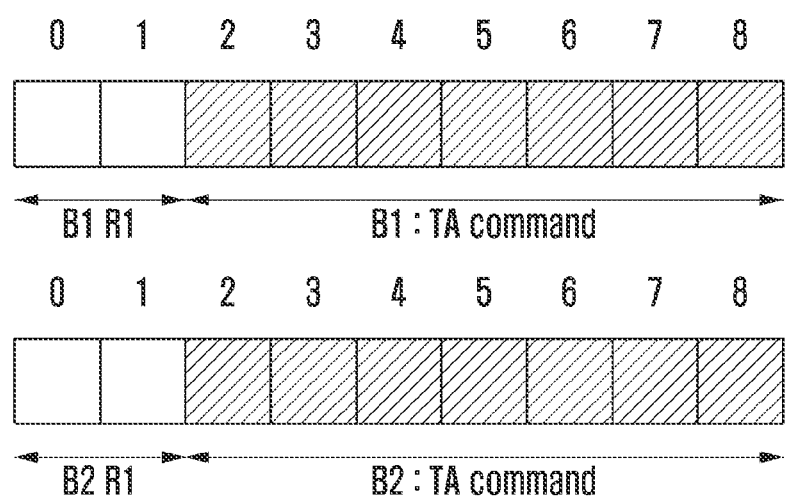
FIG. 4C illustrates a TA command update message according to an embodiment.

FIG. 4C illustrates a TA command update message according to an embodiment. Specifically, FIG. 4C illustrates another example of a TA command update message for discriminating different TA command updates for beam groups.

Referring to FIG. 4C, the existing updated messages are generated for as many as the number of beams, and all of the beams can be simultaneously updated. In FIG. 4C, B1 indicates bits for beam 1, and B2 indicates the contents for beam 2. The respective information may be updated in the existing TA commands for beams.

Option 2 corresponds to a method in which TA commands for beams are equally operated with one value, and only an offset value due to the beam change is indicated and updated. In notifying the TA value for a new beam in the existing RAR, not all of the TA command values are notified, but a TA command update message corresponding to the offset difference between the new beam and the existing beam is notified. Further, if the beam is changed in the TA command update state, the TA command update is indicated as corresponding to the difference between the TA value of the existing beam and the TA value of the changed beam.

Because option 2 corresponds to the same method as the existing method during the TA update, it can be simply implemented as compared with option 1, but has the drawback that the TA command should always be updated whenever the beam is changed. The TA command update can be transmitted through the MAC-CE or the RRC, and a method for transmitting the TA command update with the beam index change through the DCI may also be considered.

Figure 5:
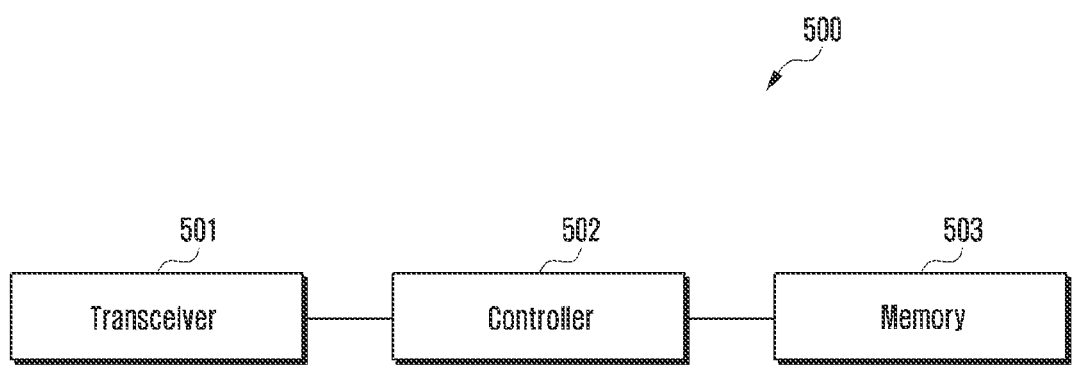
FIG. 5 is a block diagram illustrating a base station according to an embodiment.

FIG. 5 is a block diagram illustrating a base station according to an embodiment.

Referring to FIG. 5, a base station 500 includes a transceiver 501, a controller 502, and a memory 503.

The controller 502 may be connected to the transceiver 501 and the memory 503, and may control the above-described constituent elements to perform the operation of the base station 500 according to any of the above-described embodiments.

For example, the controller 502 may determine a TA value according to an RTD with respect to the terminal having transmitted a preamble according to an embodiment of the present disclosure, or may determine a TA command update message for updating the transmission timing.

The transceiver 501 may transmit and receive radio signals with the terminal. Further, under the control of the controller 502, the transceiver 501 may transmit a determined TA value and a TA command update message to the terminal, or may transmit numerology information for BWPs to the terminal.

The memory 503 may store at least one of information transmitted and received through the transceiver 501 and information generated through the controller 502.

Figure 6:
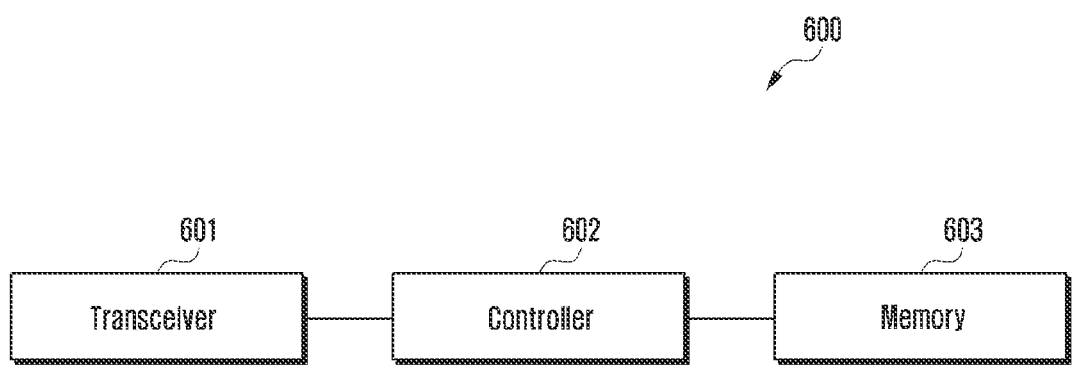
FIG. 6 is a block diagram illustrating a terminal according to an embodiment.

FIG. 6 is a block diagram illustrating a terminal according to an embodiment.

Referring to FIG. 6, a terminal 600 includes a transceiver 601, a controller 602, and a memory 603.

The controller 602 may be connected to the transceiver 601 and the memory 603, and may control the above-described constituent elements to perform the operation of the terminal 600 according to any of the above-described embodiments.

For example, the controller 602 may determine the transmission timing of an uplink signal in accordance with a TA value received from a base station, or may update the determined TA value in accordance with a TA command update message received from the base station.

The transceiver 601 may transmit and receive radio signals with the base station. Further, under the control of the controller 602, the transceiver 601 may transmit an uplink signal to the base station in accordance with the determined TA value or updated TA value.

The memory 603 may store at least one of information transmitted and received through the transceiver 601 and information generated through the controller 602.

Although various embodiments of the present disclosure have been described in the specification and drawings, these are merely used to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, if needed, the respective embodiments may be operated in combination. For example, parts of the methods proposed in the present disclosure may be combined with each other to be operated by a base station and a terminal.

Although the above-described embodiments have been proposed based on LTE/LTE-A system, other modifications based on the technical concept of the above-described embodiments can be applied to other systems, such as 5G and NR systems.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a terminal in a wireless communication system, the method comprising:
receiving, from a base station, configuration information associated with a bandwidth part (BWP), wherein the configuration information includes information on a subcarrier spacing for the BWP;
receiving, from the base station, first information on a timing advance (TA) command for adjusting a current timing of an uplink transmission of the BWP;
identifying second information corresponding to the subcarrier spacing for the BWP, wherein the second information is defined based on $(1024 \cdot 2^{-\mu})$;
determining a timing of the uplink transmission based on the first information and the second information; and
transmitting, to the base station, an uplink signal on the BWP using the determined timing of the uplink transmission,
wherein
the subcarrier spacing for the BWP is identified by:

$$(2^\mu \cdot 15) \text{ kHz},$$

where $\mu$ is an index value determined based on the information on the subcarrier for the BWP, and
wherein the subcarrier spacing is 15 kHz in case that the index value is 0, 30 kHz in case that the index value is 1, 60 kHz in case that the index value is 2, and 120 kHz in case that the index value is 3.

2. The method of claim 1, wherein the second information is a TA granularity which is determined by:

$$(1024 \cdot 2^{-\mu})T_s,$$

where $T_s$ is a time unit applied to the wireless communication system having a value of $1/480000 \times 4096$ seconds.

3. The method of claim 1, wherein the configuration information is received through radio resource control (RRC) signaling, and
wherein the first information is transmitted through a medium access control (MAC) control element (CE).

4. The method of claim 1, wherein the BWP includes a first BWP and a second BWP, and
wherein, in case that a first subcarrier spacing of the first BWP is different from a second subcarrier spacing of the second BWP, the second information is determined based on one of the first subcarrier spacing and the second subcarrier spacing.

5. The method of claim 4, wherein, in case that the first subcarrier spacing is greater than the second subcarrier spacing, the second information is determined based on the first subcarrier spacing.

6. A method performed by a base station in a wireless communication system, the method comprising:
transmitting, to a terminal, configuration information associated with a bandwidth part (BWP), wherein the configuration information includes information on a subcarrier spacing for the BWP;
transmitting, to the terminal, first information on a timing advance (TA) command for adjusting a current timing of an uplink transmission of the BWP; and
receiving, from the terminal, an uplink signal on the BWP according to a timing of the uplink transmission,
wherein the timing of the uplink transmission is determined based on the first information and second information corresponding to the subcarrier spacing for the BWP, wherein the second information is defined based on $(1024 \cdot 2^{-\mu})$, wherein the subcarrier spacing for the BWP is identified by:

$(2^\mu \cdot 15)$ kHz, where μ is an index value determined based on the information on the subcarrier spacing for the BWP, and
wherein the subcarrier spacing is 15 kHz in case that the index value is 0, 30 kHz in case that the index value is 1, 60 kHz in case that the index value is 2, and 120 kHz in case that the index value is 3.

7. The method of claim 6, wherein the second information is a TA granularity which is determined by:

$(1024 \cdot 2^{-\mu})T_s$, where $T_s$ is a time unit applied to the wireless communication system having a value of $$\frac{1}{480000 \times 4096} \text{ seconds.}$$

8. The method of claim 6, wherein the configuration information is transmitted through radio resource control (RRC) signaling, and
wherein the first information is transmitted through a medium access control (MAC) control element (CE).

9. The method of claim 6, wherein the BWP includes a first BWP and a second BWP, and
wherein, in case that a first subcarrier spacing of the first BWP is different from a second subcarrier spacing of the second BWP, the second information is determined based on one of the first subcarrier spacing and the second subcarrier spacing.

10. The method of claim 9, wherein, in case that the first subcarrier spacing is greater than the second subcarrier spacing, the second information is determined based on the first subcarrier spacing.

11. A terminal in a wireless communication system, the terminal comprising:
a transceiver; and
a controller configured to:
control the transceiver to receive, from a base station, configuration information associated with a bandwidth part (BWP), wherein the configuration information includes information on a subcarrier spacing for the BWP,
control the transceiver to receive, from a base station, first information on a timing advance (TA) command for adjusting a current timing of an uplink transmission of the BWP,
identify second information corresponding to the subcarrier spacing for the BWP, wherein the second information is defined based on $(1024 \cdot 2^{-\mu})$,
determine a timing of the uplink transmission based on the first information and the second information, and
control the transceiver to transmit, to the base station, an uplink signal on the BWP using the determined timing of the uplink transmission,
wherein the subcarrier spacing for the BWP is identified by:

$(2^\mu \cdot 15)$ kHz, where μ is an index value determined based on the information on the subcarrier for the BWP, and
wherein the subcarrier spacing is 15 kHz in case that the index value is 0, 30 kHz in case that the index value is 1, 60 kHz in case that the index value is 2, and 120 kHz in case that the index value is 3.

12. The terminal of claim 11, wherein the second information is a TA granularity which is determined by:

$(1024 \cdot 2^{-\mu})T_s$, where $T_s$ is a time unit applied to the wireless communication system having a value of $$\frac{1}{480000 \times 4096} \text{ seconds.}$$

13. The terminal of claim 11, wherein the configuration information is received through radio resource control (RRC) signaling, and
wherein the first information is transmitted through a medium access control (MAC) control element (CE).

14. The terminal of claim 11, wherein the BWP includes a first BWP and a second BWP, and
wherein, in case that a first subcarrier spacing of the first BWP is different from a second subcarrier spacing of the second BWP, the second information is determined based on one of the first subcarrier spacing and the second subcarrier spacing.

15. The terminal of claim 14, wherein, in case that the first subcarrier spacing is greater than the second subcarrier spacing, the second information is determined based on the first subcarrier spacing.

16. A base station in a wireless communication system, the base station comprising:
a transceiver; and
a controller configured to:
control the transceiver to transmit, to a terminal, configuration information associated with a bandwidth part (BWP), wherein the configuration information includes information on a subcarrier spacing for the BWP,
control the transceiver to transmit, to the terminal, first information on a timing advance (TA) command for adjusting a current timing of an uplink transmission of the BWP, and
control the transceiver to receive, from the terminal, an uplink signal on the BWP according to a timing of the uplink transmission,
wherein the timing of the uplink transmission is determined based on the first information and second information corresponding to the subcarrier spacing for the BWP, wherein the second information is defined based on $(1024 \cdot 2^{-\mu})$,
wherein the subcarrier spacing for the BWP is identified by:

$(2^\mu \cdot 15)$ kHz, where μ is an index value determined based on the information on the subcarrier spacing for the BWP, and
wherein the subcarrier spacing is 15 kHz in case that the index value is 0, 30 kHz in case that the index value is 1, 60 kHz in case that the index value is 2, and 120 kHz in case that the index value is 3.

17. The base station of claim 16, wherein the second information is a TA granularity which is determined by:

$(1024 \cdot 2^{-\mu})T_s$, where $T_s$ is a time unit applied to the wireless communication system having a value of $$\frac{1}{480000 \times 4096} \text{ seconds.}$$

18. The base station of claim 16, wherein the configuration information is transmitted through radio resource control (RRC) signaling, and wherein the first information is transmitted through a medium access control (MAC) control element (CE).

19. The base station of claim 16, wherein the BWP includes a first BWP and a second BWP, and wherein, in case that a first subcarrier spacing of the first BWP is different from a second subcarrier spacing of the second BWP, the second information is determined based on one of the first subcarrier spacing and the second subcarrier spacing.

20. The base station of claim 19, wherein, in case that the first subcarrier spacing is greater than the second subcarrier spacing, the second information is determined based on the first subcarrier spacing.

\* \* \* \* \*

UNITED STATES PATENT AND TRADEMARK OFFICE
CERTIFICATE OF CORRECTION

| | |
|---|---|
| PATENT NO. | : 11,832,203 B2 |
| APPLICATION NO. | : 17/460599 |
| DATED | : November 28, 2023 |
| INVENTOR(S) | : Sangwon Choi et al. |

It is certified that error appears in the above-identified patent and that said Letters Patent is hereby corrected as shown below:

In the Claims

In Claim 1, Column 16, Line 4:
"from abase station"
Should be:
-- from a base station --

Signed and Sealed this
Thirteenth Day of February, 2024

Katherine Kelly Vidal
*Director of the United States Patent and Trademark Office*